US005665133A

United States Patent [19]
Orii et al.

[11] Patent Number: 5,665,133
[45] Date of Patent: Sep. 9, 1997

[54] PROCESS FOR PRODUCTION OF PURE TRANSPARENT QUARTZ

[75] Inventors: Koichi Orii, Kanagawa-ken; Yukinobu Hara, Aomori-ken; Tomoyuki Akiyama, Yamagata-ken; Koji Tsukuma, Ibaraki-ken; Yoshikazu Kikuchi, Yamagata-ken, all of Japan

[73] Assignees: Tosoh Corporation, Shinnanyo; Nippon Silica Glass Co., Ltd., Tokyo, both of Japan

[21] Appl. No.: 541,467

[22] Filed: Oct. 10, 1995

[30] Foreign Application Priority Data

Oct. 14, 1994 [JP] Japan ................................. 6-249417

[51] Int. Cl.⁶ .......................... C03B 19/00; C03C 15/00
[52] U.S. Cl. ............................. 65/17.6; 65/30.1; 501/54
[58] Field of Search ........................ 65/30.1, 17.6; 501/54

[56] References Cited

U.S. PATENT DOCUMENTS

| | | | |
|---|---|---|---|
| 4,828,594 | 5/1989 | Morishita et al. | 65/18.4 |
| 5,154,905 | 10/1992 | Ohshima et al. | 423/335 |
| 5,302,556 | 4/1994 | Shimizu et al. | 501/12 |
| 5,330,941 | 7/1994 | Yaba et al. | 501/54 |

FOREIGN PATENT DOCUMENTS

| | | |
|---|---|---|
| 0 173 961 | 3/1986 | European Pat. Off. . |
| 0 206 353 | 12/1986 | European Pat. Off. . |
| 0 258 457 | 3/1988 | European Pat. Off. . |
| 0 258 456 | 3/1988 | European Pat. Off. . |
| 0 258 455 | 3/1988 | European Pat. Off. . |
| 0 322 881 | 7/1989 | European Pat. Off. . |
| 0 385 753 | 9/1990 | European Pat. Off. . |

OTHER PUBLICATIONS

Introduction to Ceramics, by Kingery et al. pp. 71,764 1975.
Patent Abstracts of Japan, vol. 12, No. 444 (C–545), Nov. 22, 1988, JP–63–166730, Jul., 1988.
Patent Abstracts of Japan, vol. 13, No. 457 (C–644) (3805), Oct. 16, 1989, JP–1–176243,.
Database WPI, Derwent Publications, AN–89–360753, JP–1–270530, Oct. 27, 1989.

*Primary Examiner*—Donald E. Czaja
*Assistant Examiner*—Jacqueline A. Ruller
*Attorney, Agent, or Firm*—Oblon, Spivak, McClelland, Maier & Neustadt, P.C.

[57] ABSTRACT

Pure transparent quartz glass is provided by molding powdery amorphous silica into an article, converting the molded powdery amorphous silica into crystalline silica of high-temperature type cristobalite structure, and then fusing the crystalline silica, the quartz glass containing impurities respectively at a content of not higher than 1 ppm, and an OH group at a content of not higher than 20 ppm, and having a viscosity of $10^{12.0}$ poise or more at 1200° C. The quartz glass is transparent and has high purity, and is excellent in high temperature viscosity characteristics. The quartz glass can be produced at a low cost.

5 Claims, No Drawings

PROCESS FOR PRODUCTION OF PURE TRANSPARENT QUARTZ

BACKGROUND OF THE INVENTION

1. Field of the Invention

The present invention relates to transparent quartz glass of high purity produced by molding powdery amorphous silica, and sintering and fusing the molded article of amorphous silica. Particularly, the present invention relates to pure transparent quartz glass which contains less impurities like alkalis respectively at a content of not more than 1 ppm, contains less water, and has high heat resistance, thereby being useful for a photomask and other uses in semiconductor production.

The present invention also relates to a process for producing the pure transparent quartz glass.

2. Description of the Related Art

Conventionally, transparent quartz glass is produced by a process of melting powdery quartz crystal in vacuo in a furnace, a process of melting powdery quartz crystal by oxyhydrogen flame, or a like process. However, the conventional processes employ powdered natural quartz crystal, whereby the resulting quartz glass is not satisfactory to meet the severe requirements for high purity for highly integrated LSI, even though the quartz glass has high heat resistance. Although the powdered natural quartz crystal is treated for high purity, not all of the undesired impurities can be removed to respective contents of not higher than 1 ppm at the moment.

To obtain higher purity of the quartz glass, processes are investigated, including a VAD process which sinters deposited synthetic amorphous silica, and a sol-gel process which sinters powdery amorphous silica obtained by hydrolysis of a silicic acid alkoxide. However, the synthetic powdery amorphous silica, although it can be produced in higher purity, gives quartz glass inferior in heat resistance to the one obtained from natural quartz material, disadvantageously. This disadvantage is presumed to be due to water included during the synthesis of the quartz glass, or the structure of the glass.

To offset the above disadvantage, a process is proposed for producing the glass by crystallizing amorphous silica and then fusing it. This process, which employs a crystallization promoter such as alkali or alumina, involves a problem of contamination with impurities which affect adversely the transparency to lower the quality of the product. The impurities cannot readily be eliminated. For example, elimination by heat treatment requires long time to lower the productivity.

Another process is proposed in which powdery amorphous silica is converted to powdery cristobalite and then it is fused. This process requires much time for grinding the powdery crystal, and resulting ground matter is poor in moldability disadvantagesouly, and is not suitable for industrial production.

SUMMARY OF THE INVENTION

The present invention intends to provide a pure transparent quartz glass which is as pure as the one produced from the synthetic silica, containing impurities like alkali metals respectively at a content of not higher than 1 ppm, and further has heat resistance as high as the one produced from the powdery natural quartz crystal.

The present invention also intends to provide a process for producing the above pure transparent quartz glass without contamination by impurities and at high productivity.

The pure transparent quartz glass of the present invention is produced by molding powdery amorphous silica into an article, converting the molded powdery amorphous silica into crystalline molded silica of high-temperature type cristobalite structure, and then fusing the crystalline molded silica, the quartz glass containing Li, Na, Mg, Ca, K, Al, Ti, Cr, Ni, Zn, Zr, Mo, Fe, and Cl respectively at a content of not higher than 1 ppm, and an OH group at a content of not higher than 20 ppm, and having a viscosity of $10^{12.0}$ poise or more at 1200° C.

The process for producing the pure transparent quartz glass of the present invention comprises steps of molding powdery amorphous silica into an article, converting the molded powdery amorphous molded silica in a vacuum or a helium atmosphere into crystalline molded silica of high-temperature type cristobalite structure (with simultaneous sintering), and then fusing the crystalline molded silica into glass, wherein the molded silica is converted into the crystalline molded silica without addition of any crystallization promoter like an alkali metal compound or alumina.

DETAILED DESCRIPTION OF THE PREFERRED EMBODIMENTS

The pure transparent quartz glass of the present invention contains Li, Na, Mg, Ca, K, Al, Ti, Cr, Ni, Zn, Zr, Mo, Fe, and Cl respectively at a content of not higher than 1 ppm. With any of the above specified impurities contained at a content of higher than 1 ppm, the quartz glass tends to decrease the light transmissivity, and is not suitable for the production of semiconductors. The respective contents of the above impurities are preferably not higher than 0.5 ppm.

The pure transparent quartz glass of the present invention contains an OH group at a content of not higher than 20 ppm. At a higher content thereof, the quartz glass tend to decrease its heat resistance, and tends to deform at a higher temperature, disadvantageously. The content of the OH group is preferably not higher than 10 ppm.

The pure transparent quartz glass of the present invention has a viscosity of $10^{12.0}$ poise or more at 1200° C. The quartz glass having the viscosity of lower than $10^{12.0}$ poises will deform at heat treatment of semiconductors at 1200° C., and is not useful for semiconductor production. The viscosity is preferably not lower than $10^{13.0}$ poises.

The process for producing the pure transparent quartz glass of the present invention comprises steps of molding powdery amorphous silica into an article, converting the molded powdery amorphous silica in a vacuum or a helium atmosphere into crystalline molded silica of high-temperature type cristobalite structure with simultaneous sintering, and then fusing the crystalline molded silica, wherein the molded silica is converted into the crystalline molded silica without addition of any crystallization promoter like an alkali metal compound or alumina.

In the aforementioned process, the powdery amorphous silica is sintered at the heat treatment for converting it into high-temperature type cristobalite crystal structure.

The powdery amorphous silica as the starting material for the above process is prepared by reacting an aqueous solution of alkali metal silicate with an acid and purifying the resulting silica. The starting powdery amorphous silica contains Li, Na, Mg, Ca, K, Al, Ti, Cr, Ni, Zn, Zr, Mo, Fe, and Cl respectively at a content of not higher than 1 ppm. With such a starting material, impurity removal from the produced quartz glass can be omitted.

The heat treatment for the crystal structure conversion is conducted in a vacuum or helium atmosphere, because heat treatment in other atmosphere (e.g., in air, nitrogen gas, argon gas, etc.) causes formation of gas bubbles in the sintered compact to impair the transparency of the quartz glass.

The respective steps of the process for the pure transparent quartz glass of the present invention are described below in detail.

1. Preparation of Starting Powdery Material

The starting powdery material, namely powdery amorphous silica, may be prepared by any method which is capable of giving amorphous silica in high purity. The method includes hydrolysis of silicic acid alkoxide, hydrolysis of silicon tetrachloride by oxyhydrogen flame, acid treatment of an aqueous alkali silicate solution, and so forth. Of these method, the acid treatment of alkali silicate solution is suitable for obtaining powdery amorphous silica having high purity and high moldability. This method is disclosed in JP-A-62-3011, JP-A-62-3012, JP-A- 62-283809, JP-A-62-283810, etc. (The term "JP-A" herein means "Japanese Patent Laid-Open Publication".) In this method, an aqueous alkali silicate solution having a viscosity ranging from 2 to 500 poises is extruded through a nozzle of orifice diameter of 1 mm or less into a coagulation bath containing a water-miscible organic medium or an acid solution of a normality of 4 or lower to cause coagulation (coagulation treatment); the resulting fiber-shaped or column-shaped gel is treated with a solution containing an acid (acid treatment); and then the acid-treated matter is washed with water to extract and remove the impurities; or further the washed matter is heat-treated at a temperature of 1000° C. or higher to obtain amorphous silica containing less impurities of alkali metals and alkaline earth metals at a content respectively of not higher than 1 ppm.

The powdery silica obtained as above has an average particle diameter ranging preferably from 0.5 to 20 µm, more preferably from 1 to 10 µm, still more preferably from 1.5 to 10 µm in order to obtain satisfactory moldability in the molding or satisfactory sintering characteristics in the sintering conducted later. Such satisfactory powdery silica can be obtained by control of the conditions of production thereof and selection of the produced powdery matter.

2. Molding of Powdery Silica

The resulting powdery silica is molded by press-molding by use of a mold tool, slip cast molding in which a powder-containing slurry is poured into a gypsum or plastic mold tool, and the slurry is solidified therein, or a like molding method. The molding may be conducted by any method provided that the powdery pure amorphous silica can be molded without contamination by impurities. A binder or the like additive may be added to the improve the strength of the molded product. Preferably, however, no additive like a binder is added to avoid the contamination with impurities.

3. Sintering and Conversion of Molded Amorphous Silica

The aforementioned molded article is heated to crystallize the constituting powdery amorphous silica to convert it into powdery high-temperature type cristobalite and to sinter it. Before this crystallization step, pretreatment such as heat drying or binder removal may be conducted without any adverse effect.

In conventional processes, addition of powdery cristobalite or a crystallization promotor such as an aluminum compound and an alkali compound to the amorphous silica was proposed for promoting the conversion to the cristobalite structure. The addition of the foreign matter, however, necessitates an impurity removal step as described above. In the present invention, no additive is added for promotion of crystallization, and crystallization is allowed to proceed with retention of the purity of the powdery starting material, thus no post-treatment such as impurity removal being required.

The process of the present invention utilizes rearrangement of amorphous structure on heating. Therefore, the atmosphere for the heating is not specially limited. However, to minimize the size and number of pores in the formed crystal, the heating is preferably conducted in a vacuum or a helium gas atmosphere. The vacuum in the present invention means a pressure of $10^{-1}$ torr or higher vacuum, more preferably $10^{-2}$ torr or higher vacuum.

An excessively low or high treating temperature retards the rearrangement. A further higher temperature causes melting of the crystal. Therefore, the heat treatment is required to be conducted at a temperature higher than the glass transition temperature and lower than the melting point, preferably in the range of from 1350° to 1650° C., more preferably from 1450° C. to 1600° C.

4. Fusion of Crystal

The crystalline matter obtained by the above conversion is further heated to a higher temperature to fuse the crystal into glass. In this fusion step, the crystal to be fused which has a cristobalite structure is required to be heated above the melting point of cristobalite, namely 1713° C. or higher. For the complete fusion thereof, the heating temperature is preferably not lower than 1750° C., more preferably not lower than 1800° C. The fused matter is held at a temperature above the melting point for a predetermined time for complete fusion. The time for the fusion depends on the temperature and the shape of the molded article. If the heating temperature is such that the molded article is fused instantaneously, the fused matter need not be kept at that temperature.

The gas bubbles remaining in the fused glass depend on the structure of the crystalline matter before the fusion thereof. The fusion may be conducted in an inert gas atmosphere such as helium, argon, and nitrogen, in a vacuum, or in any other atmosphere.

The present invention provides pure quartz glass from powdery pure amorphous silica without contamination with impurity. Therefore, no treatment is required for impurity removal in the present invention. Specifically, the present invention provides pure quartz glass containing less impurities of Li, Na, Mg, Ca, K, Al, Ti, Cr, Ni, Zn, Zr, Mo, Fe, and Cl respectively at a content of not higher than 1 ppm. Since the amorphous silica is converted during the sintering into the crystal of cristobalite structure, water is removed to result in the low OH group content of not more than 20 ppm, and the resulting glass has a structure approximate to crystal. Accordingly, the viscosity of the quartz glass at a high temperature is improved, and the pure quartz glass of the present invention has a viscosity of $10^{12.0}$ poises or higher at 1200° C.

The present invention is described below in more detail by reference to Examples without limiting the invention thereto. The analysis and the measurements are conducted as described below.

ANALYSIS OF IMPURITIES

A specimen of 2 cm×2 cm×1 cm (thickness) in size is pretreated with a hydrofluoric acid solution to dissolve about ⅓ thereof, and then the rest of the specimen is dissolved in another hydrofluoric acid solution. The impurities in the latter hydrofluoric acid solution is analyzed by means of ICP-mass apparatus (atomic absorption-mass spectrometer: Model TQ-2, Fison Instrument Co.).

OH GROUP CONTENT

IR light transmittance through a specimen of 2 cm×2 cm×1 cm (thickness) at 3700 $cm^{-1}$ of OH group is measured by means of a FT-IR spectrometer (FT-IR-8100M, Shimazu Corp.).

VISCOSITY

The viscosity is derived according to a beam bending method by heating a piece of glass and measuring the deformation thereof.

EXAMPLE 1

Preparation of Starting Powdery Amorphous Silica

Water glass of JIS #3 is concentrated by heating to have a viscosity of 300 cps at 20° C. About 8 liters of this water glass was extruded through a filter (opening: 70 μm) and nozzles (50 nozzles of 0.2 mm in diameter) by application of pump pressure at an extrusion rate of 0.7 m/sec into a coagulation bath containing 300 liters of aqueous 8 wt % sulfuric acid solution kept at 50° C.

The resulting silica in a fiber shape was immersed in 10 times amount of newly prepared aqueous 8 wt % sulfuric acid, and was stirred therein at a temperature of 95° C. for about one hour to extract impurities. Then the silica was washed twice, each with 10 times amount of pure water. The above extraction-washing operation was conducted repeatedly five times. The silica was separated by centrifugation from water, and the obtained wet silica was dried at 150° C. for 8 hours in a hot-air drier to obtain 3.7 kg of water glass type amorphous silica of water content of 7% by weight (based on calcined silica).

The obtained powdery amorphous silica was further heat-treated in the air at 1200° C. for 10 hours, and then was pulverized by means of a ball mill made of quartz glass to obtain powder of 5 μm in average diameter.

This powdery amorphous silica contained impurities of Na, K, Mg, Ca, Fe, Ti, Al, and Cl respectively at a content of not more than 1 ppm.

Molding of Starting Powdery Amorphous Silica

In 0.8 kg of pure water, 1.2 kg of the above powdery amorphous silica was dispersed to obtain a slurry. The slurry was poured into a porous casting mold having a cavity of 400 mm×400 mm×5 mm and made of an epoxy resin. Water was removed therefrom, and the powdery silica was dried. The resulting molded article had a bulk density of 1.6 g/cm$^3$.

Sintering, and Fusion of Molded Article into Glass

The molded article was placed in an electric furnace, and heated in a vacuum ($3 \times 10^{-3}$ torr) at 1450° C. for 5 hours. Thereafter, gaseous nitrogen was introduced thereto to a pressure of 1 kg/cm$^2$, and the temperature was elevated to 1800° C. and kept at this temperature for 5 minutes. Then the electric furnace was cooled, and the specimen was taken out.

The obtained glass had very few gas bubbles and had high transparency. The contents of the impurities and OH group in the glass, and the viscosity the glass at 1200° C. are shown in Table 1.

EXAMPLE 2

Preparation of Starting Powdery Amorphous Silica

The starting powdery amorphous silica was prepared in the same manner as in Example 1.

Molding of Starting Powdery Amorphous Silica

The starting powdery amorphous silica was molded into an article in the same manner as in Example 1.

Sintering, and Fusion of Molded Article into Glass

The molded article was placed in an electric furnace, and heated in a vacuum ($3 \times 10^{-3}$ torr) at 1500° C. for 5 hours. Thereafter, gaseous nitrogen was introduced thereto to a pressure of 1 kg/cm$^2$, and the temperature was elevated to 1780° C. and kept for 5 minutes. Then the electric furnace was cooled, and the specimen was taken out.

The obtained glass had very few gas bubbles and had high transparency. The contents of the impurities and OH group in the glass, and the viscosity of the glass at 1200° C. are shown in Table 1.

EXAMPLE 3

Preparation of Starting Powdery Amorphous Silica

The starting powdery amorphous silica was prepared in the same manner as in Example 1.

Molding of Starting Powdery Amorphous Silica

The starting powdery amorphous silica was molded into an article by use of a metal press mold tool of 150 mm ×50 mm at a pressure of 200 kg/cm$^2$. The molded article was put into an ice bag made of rubber, and was pressurized again at a pressure of 2000 kg/cm$^2$ in a CIP apparatus. The resulting molded article had a bulk density of 1.5 g/cm$^3$.

Sintering, and Fusion of Molded Article into Glass

The molded article was sintered and fused in the same manner as in Example 1. The obtained glass had very few gas bubbles and had high transparency. The contents of the impurities and OH group in the glass, and the viscosity of the glass at 1200° C. are shown in Table 1.

EXAMPLE 4

Preparation of Starting Powdery Amorphous Silica

One kilogram of ethyl silicate, 2 liters of ethanol, 660 g of pure water, and 500 g of aqueous 28% ammonia solution were mixed, and stirred at room temperature for 15 hours to allow hydrolysis to proceed and to precipitate silica. The precipitated silica was dried with an evaporator, and then calcined at 1050° C. in the air for 5 hours. The calcined powdery silica was pulverized by means of a ball mill made of quartz to have an average diameter of 0.5 μm.

This powdery amorphous silica contained impurities of Na, K, Mg, Ca, Fe, Ti, Al, and Cl respectively at a content of not more than 1 ppm.

Molding of Starting Powdery Amorphous Silica

The powdery amorphous silica was molded with a mold tool of the same material as that in Example 1 into a molded article of 170 mm in diameter and 10 mm in thickness. The molded article had a bulk density of 1.16 g/cm$^3$.

Sintering, and Fusion of Molded Article into Glass

The molded article was sintered and fused in the same manner as in Example 1. The obtained glass had very few gas bubbles and had high transparency. The contents of the impurities and OH group in the glass, and the viscosity of the glass at 1200° C. are shown in Table 1.

As shown in Table 1, transparent silica glass containing less impurities like alkalis and having high viscosity at high temperature could be produced from powdery amorphous silica of high purity by molding, heating, crystallizing, and fusing it.

Comparative Example 1

The starting powdery amorphous silica prepared in Example 1, without molding, was heat-treated for conversion into cristobalite crystal structure. The heat-treated powdery matter was subjected to molding process. However, the molding was not successful. Therefore, the subsequent steps of molding, sintering, and fusion could not be conducted.

As described in detail, the quartz glass prepared according to the present invention is transparent glass having high purity and having excellent characteristics in high temperature viscosity. The process of the present invention provides transparent quartz glass of high purity at a low cost.

TABLE 1

|  | Example | | | |
|---|---|---|---|---|
|  | 1 | 2 | 3 | 4 |
| Li | <0.01 | <0.01 | <0.01 | <0.01 |
| Na | 0.24 | 0.14 | 0.04 | 0.06 |
| Mg | 0.06 | 0.06 | 0.06 | 0.08 |
| Ca | 0.25 | 0.18 | 0.38 | 0.55 |
| K | 0.74 | 0.17 | 0.44 | 0.24 |
| Al | 0.60 | 0.60 | 0.64 | 0.60 |
| Ti | 0.32 | 0.31 | 0.33 | 0.30 |
| Cr | 0.31 | 0.29 | 0.30 | 0.30 |
| Ni | 0.10 | 0.17 | 0.12 | 0.03 |
| Zn | 0.03 | 0.06 | 0.03 | 0.03 |
| Zr | 0.08 | 0.08 | 0.06 | 0.08 |
| Mo | 0.05 | 0.05 | 0.05 | 0.05 |
| Fe | 0.20 | 0.23 | 0.15 | 0.30 |
| Cl | <1 | <1 | <1 | <1 |
| OH | 8 | 15 | 5 | 3 |
| Viscosity (poise, at 1200° C.) | $10^{13.2}$ | $10^{12.4}$ | $10^{13.3}$ | $10^{13.5}$ |

Unit of impurity content: ppm

What is claimed is:

1. A process for producing pure transparent quartz glass, comprising steps of molding powdery amorphous silica into an article, converting the molded powdery amorphous silica in a vacuum or a helium atmosphere into crystalline molded silica of high-temperature cristobalite structure, and then fusing the crystalline silica into glass, wherein the molded silica is converted into the crystalline silica without addition of any crystallization promoter.

2. The process for producing pure transparent quartz glass according to claim 1, wherein the powdery amorphous silica used for molding is produced by reaction of an aqueous solution of an alkali metal silicate with an acid and purification of the product of the reaction, and contains Li, Na, Mg, Ca, K, Al, Ti, Cr, Ni, Zn, Zr, Mo, Fe, and Cl respectively at a content of not higher than 1 ppm.

3. The process according to claim 1, wherein fusing the crystalline silica into glass is at a temperature of 1713° C. or higher.

4. The process according to claim 1, wherein fusing the crystalline silica into glass is at a temperature of not lower than 1750° C.

5. The process according to claim 1, wherein fusing the crystalline silica into glass is at a temperature not lower than 1800° C.

* * * * *